(No Model.)
H. L. WILLHOITE.
COMBINED HAY RAKE AND LOADER.
No. 315,366. Patented Apr. 7, 1885.
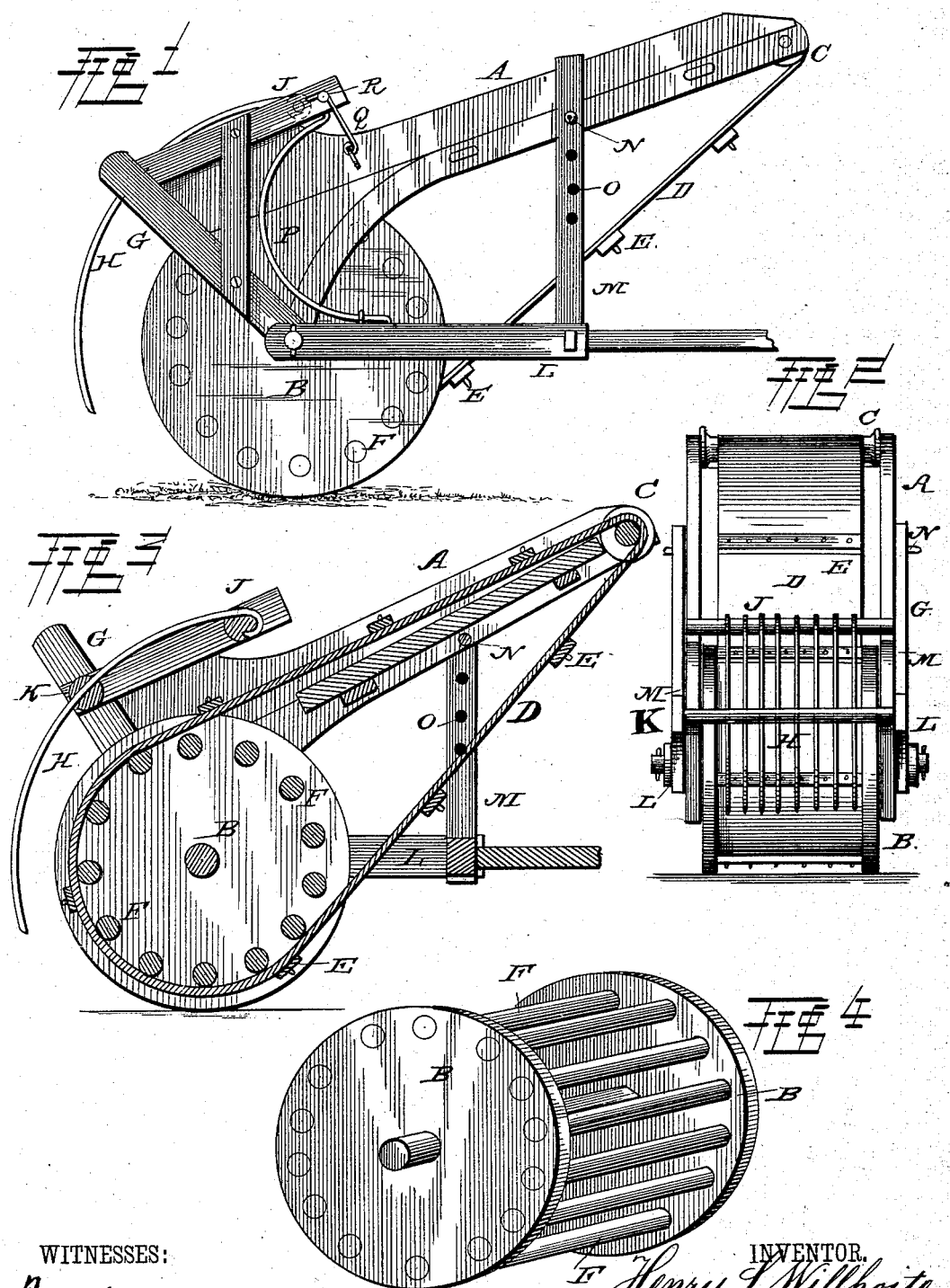
WITNESSES:
INVENTOR.
Henry L. Willhoite
By Louis Bagger & Co.
ATTORNEYS.

UNITED STATES PATENT OFFICE.

HENRY L. WILLHOITE, OF COLFAX, ILLINOIS.

COMBINED HAY RAKE AND LOADER.

SPECIFICATION forming part of Letters Patent No. 315,366, dated April 7, 1885.

Application filed March 6, 1884. (No model.)

*To all whom it may concern:*

Be it known that I, HENRY L. WILLHOITE, a citizen of the United States, and a resident of Colfax, in the county of McLean and State of Illinois, have invented certain new and useful Improvements in a Combined Hay Rake and Loader; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved hay-loader. Fig. 2 is a rear view of the same. Fig. 3 is a longitudinal vertical section of the same, and Fig. 4 is a perspective detail view of the drum.

Similar letters of reference indicate corresponding parts in all the figures.

My invention has relation to hay rakes and loaders; and it consists in the improved construction and combination of parts of the same, as hereinafter more fully described and claimed.

In the accompanying drawings, the letter A indicates an inclined elevator-frame, forming bearings in its lower ends for the axle of the drive-drum B, and forming bearings at its upper ends for a roller, C. An endless apron, D, passes over the drum and the roller and is provided with a number of toothed cross-strips, E, secured upon the outside of the apron, serving to carry the hay to the upper end of the elevator, and the periphery of the drum is composed of cross strips or bars F, between which the cross-strips upon the apron will catch through the flexible apron, preventing the apron from slipping upon the drum.

G is the rake-frame, which is hinged to the ends of the drive-axle extending rearward, and the teeth H, which are constructed of flexible rods, are secured at their upper ends in a cross-piece, J, secured between the upper ends of the frame, and pass through a cross-piece, K, in the rear end of the frame, whereupon they are curved to conform to the periphery of the drum. A forwardly-extending frame, L, is hinged with its rear ends upon the ends of the axle, and is adapted to be attached to the rear end of a wagon with its forward end, and two uprights, M, project from the forward end of the frame and bear against the sides of the elevator-frame, which latter is supported in its inclined position by a rod, N, passing through a transverse perforation or bearing in the elevator-frame, and through perforations O in the uprights, of which perforations each upright has a series, so that the elevator-frame may be raised or lowered, as desired. A spring, P, is secured at one end to the upper edge of the rear end of each side piece of the forwardly-extending frame or draft-frame, and is secured at its upper end to the upper end of each of the side pieces of the rake-frame, forcing the rake-frame and its teeth against the ground, and when it is desired to keep the teeth off the ground—as, for instance, in moving the loader from one field to another—a hook, Q, is pivoted upon the side of the frame of the elevator, and may engage a pin or lug, R, upon the upper end of the rake-frame, holding it up.

Having thus described my invention, I claim and desire to secure by Letters Patent of the United States—

The combination, in a hay rake and loader, of an inclined elevator-frame forming bearings at its ends, a drive-drum journaled in the lower end of the elevator-frame, a roller journaled in the upper end of the elevator-frame, an endless apron passing over the drum and the roller and having transverse toothed cross-strips, a rake-frame hinged to the drive-axle and having flexible teeth secured at their upper ends in a cross-piece and passing through another cross-piece of the frame, a forwardly-extending draft-frame hinged to the drive-axle and having two perforated uprights bearing against the sides of the elevator, a rod passing through the elevator-frame and the uprights, springs secured to the rear ends of the draft-frame and to the upper ends of the rake-frame, and a hook hinged upon the elevator and engaging a lug upon the rake-frame, all constructed and combined as and for the purpose shown and set forth.

In testimony that I claim the foregoing as my own I have hereunto affixed my signature in presence of two witnesses.

HENRY L. WILLHOITE.

Witnesses:
S. G. McCURDY,
C. F. SPANGLER.